United States Patent
Miller et al.

(10) Patent No.: US 8,078,754 B2
(45) Date of Patent: *Dec. 13, 2011

(54) GROUP ACCESS PRIVATIZATION IN CLUSTERED COMPUTER SYSTEM

(75) Inventors: Robert Miller, Rochester, MN (US); Vicki Lynn Morey, Pine Island, MN (US); Laurie Ann Williams, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 591 days.

This patent is subject to a terminal disclaimer.

(21) Appl. No.: 12/131,475

(22) Filed: Jun. 2, 2008

(65) Prior Publication Data

US 2008/0235333 A1    Sep. 25, 2008

Related U.S. Application Data

(63) Continuation of application No. 09/845,596, filed on Apr. 30, 2001, now Pat. No. 7,433,957.

(51) Int. Cl.
    *G06F 15/16* (2006.01)
(52) U.S. Cl. .. 709/238; 709/204; 709/229; 707/E17.001
(58) Field of Classification Search .................. 709/204, 709/229, 238; 707/E17.001
See application file for complete search history.

(56) References Cited

U.S. PATENT DOCUMENTS

| | | | |
|---|---|---|---|
| 5,079,767 A | 1/1992 | Perlman | |
| 5,361,256 A | 11/1994 | Doeringer et al. | |
| 5,371,852 A | 12/1994 | Attanasio et al. | |
| 5,778,187 A | 7/1998 | Monteiro et al. | |
| 5,805,572 A | 9/1998 | Bernabeu-Auban et al. | |
| 5,835,723 A | 11/1998 | Andrews et al. | |
| 5,850,396 A | 12/1998 | Gilbert | |
| 5,974,417 A | 10/1999 | Bracho et al. | |
| 5,978,779 A | 11/1999 | Stein et al. | |
| 5,978,802 A | 11/1999 | Hurvig | |
| 6,047,323 A | 4/2000 | Krause | |
| 6,061,346 A * | 5/2000 | Nordman | 370/352 |
| 6,192,417 B1 | 2/2001 | Block et al. | |
| 6,243,825 B1 | 6/2001 | Gamache et al. | |

(Continued)

FOREIGN PATENT DOCUMENTS

JP      00/228674      8/2000

(Continued)

OTHER PUBLICATIONS

"Sun Cluster 3.0 Concepts," Nov. 2000, XP002455745, pp. 19-26, 31-37, 49-54, http://student.ing-steen.se/unix/sundoc/cluster/806-1424.pdf.

(Continued)

*Primary Examiner* — Carl Colin
*Assistant Examiner* — Mohammad Siddiqi
(74) *Attorney, Agent, or Firm* — Wood, Herron & Evans, LLP

(57) ABSTRACT

An apparatus, clustered computer system, and program product rely on cluster-private group names to perform accesses to groups that are resident in a clustered computer system. Thus, for a cluster-accessible group, all nodes capable of participating in a cluster are configured to map to the same cluster-private group name for that group, so that any external user that has access to the clustered computer system can access the group name and utilize the group name to initiate operations by the group.

12 Claims, 2 Drawing Sheets

U.S. PATENT DOCUMENTS

| | | | |
|---|---|---|---|
| 6,453,035 B1 * | 9/2002 | Psarras et al. | 379/221.08 |
| 6,470,389 B1 | 10/2002 | Chung et al. | |
| 6,535,990 B1 | 3/2003 | Iterum et al. | |
| 6,549,538 B1 | 4/2003 | Beck et al. | |
| 6,636,597 B2 | 10/2003 | Porter et al. | |
| 6,665,304 B2 | 12/2003 | Beck et al. | |
| 6,725,264 B1 * | 4/2004 | Christy | 709/225 |
| 6,772,226 B1 | 8/2004 | Bommareddy et al. | |
| 6,993,034 B1 | 1/2006 | Block et al. | |
| 7,433,957 B2 * | 10/2008 | Miller et al. | 709/229 |

FOREIGN PATENT DOCUMENTS

| | | |
|---|---|---|
| WO | 99/17203 A1 | 4/1999 |
| WO | 99/59064 A1 | 11/1999 |
| WO | 00/007101 A1 | 2/2000 |

OTHER PUBLICATIONS

Microsoft Computer Dictionary Fifth Edition p. 104.

* cited by examiner

GROUP ACCESS PRIVATIZATION IN CLUSTERED COMPUTER SYSTEM

CROSS-REFERENCE TO RELATED APPLICATIONS

This application is a continuation of U.S. patent application Ser. No. 09/845,596, filed on Apr. 30, 2001 by Robert Miller et al. (now issued as U.S. Pat. No. 7,433,957), the entire disclosure of which is incorporated by reference herein.

FIELD OF THE INVENTION

The invention is generally directed to clustered computer systems, and in particular, to managing accesses to groups resident on such systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

While the member jobs in a group utilize ordered messaging to communicate with one another to cooperatively perform tasks, typically a clustered computer system also requires support for entities that are external to a group to send a request to the group to perform various group operations. Conventionally, external access to a group has been supported through assigning a specific network address (e.g., a TCP/IP address) to the group, such that an external entity wishing to access a group can send a request to that specific address. This technique is sometimes called N+1 addressing, where N addresses are assigned to the N nodes in a group, plus one additional address for the group itself.

As with other conventional network addressing protocols, typically a name service is provided in a conventional clustered computer system to map network addresses of groups to "group names". A name can generally be any form of shorthand identifier or alias for a particular entity that is accessible over a network. An advantage to using a name in lieu of the direct address to access a networked entity is that since a network address assigned to an entity may change from time to time, the entity can always be accessed by the name even if the mapping of the name is modified.

The address of an entity on a network, including that of a cluster node or a group, is typically obtained in a conventional clustered computer system by accessing a network name server such as a directory name service (DNS) server resident on the network. Thus, should an entity desire to access another entity on a network, the accessing entity typically resolves the name of the entity to be accessed through the network name server, and then sends a message to the network address returned by the server. Thus, in the case of an external access to a group, an entity wishing to send a request to the group resolves the group name through the network name server, and sends a message to the group address that is returned by the server.

The use of an external name server in connection with accessing a group presents a number of problems. First, a significant concern is presented that a node or other entity outside of a cluster could send messages to a group that could interfere with the group's operation. Particularly given the security risks presented by viruses, Trojan horses, and other malicious programs, and coupled with the increasing use of the Internet, the ability to access a group simply by accessing a network address associated with that group presents a significant security risk for a clustered computer system.

Second, in many instances, it may be desirable to implement multiple clusters, or cluster "instances", on a given clustered computer system or network, e.g., in a logically partitioned system where multiple cluster instances may execute concurrently in different logical computer systems that execute on the same physical system. Where multiple clusters exist, however, a limitation is presented in that the same group name cannot exist in each cluster, since a common name server that cannot resolve a group name to different network addresses is often used. Conventionally, clusters can avoid these problems by requiring a separate dedicated Local Area Network (LAN) for each cluster, and by prohibiting any cluster from spanning subnets. However, it is often desirable to implement a clustered computer system in a wide variety of network topologies, including geographically-disbursed implementations where nodes may be interconnected with one another over large distances, and implementations where nodes are coupled over a public network such as the Internet. Consequently, restricting a cluster to a dedicated LAN is not desirable in many circumstances.

Therefore, a significant need exists in the art for manner of supporting external accesses to groups resident in a clustered computer system, and in particular a mechanism for supporting external access to groups that is capable of limiting access only to authorized entities.

SUMMARY OF THE INVENTION

The invention addresses these and other problems associated with the prior art by providing an apparatus, clustered computer system, and program product that rely on cluster-private group names to access groups that are resident in a clustered computer system. Put another way, for a cluster-accessible group, all nodes capable of participating in a cluster are configured to map to the same cluster-private group name for that group, so that any external user that has access to the cluster can access the group name and utilize the group name to initiate operations by the group. Unauthorized users (e.g., users on unauthorized nodes), in contrast, are typically restricted from accessing the group name or issuing requests to a cluster using that group name, and are thus restricted from accessing the group.

In embodiments consistent with the invention, the mapping of cluster-private group names to the addresses of the group members (e.g., the network addresses of the nodes upon which the group members are resident) can be effectively "hidden" from nodes or users that are outside of the cluster through the use of a group address data structure that is accessible only on nodes that participate in a cluster. In addition, embodiments consistent with the invention typically resolve the mapping of group names to group member addresses locally on each node, thus eliminating the need for an external name server or other centralized resource.

Typically, the clustering infrastructure on each node is utilized to both host and utilize the name-address mapping, such that group access requests can be handled internally within and between the clustering infrastructures of the various nodes in a cluster. As such, only entities that have access to the clustering infrastructure on a node (typically entities that reside on the same node), as well as access to the appropriate group name to pass to the clustering infrastructure, are typically permitted to access a particular group.

Therefore, consistent with one aspect of the invention, an apparatus includes a memory accessible by a first node among a plurality of nodes in a clustered computer system, and a program resident in the memory and executed by the first node. The program is configured to access a group that includes a plurality of members resident respectively on the plurality of nodes by receiving an access request that identifies a cluster-private group name associated with the group, where the plurality of members in the group map to the cluster-private group name, and processing the access request to initiate a group operation on at least a subset of the plurality of nodes that map to the cluster-private group name.

Consistent with another aspect of the invention, a clustered computer system includes a plurality of nodes coupled to one another over a network, a group including a plurality of members resident respectively on the plurality of nodes, where the plurality of members in the group map to a cluster-private group name, and a program resident in a first node among the plurality of nodes and configured to access the group by receiving an access request that identifies the cluster-private group name associated with the group, and processing the access request to initiate a group operation on at least a subset of the plurality of nodes that map to the cluster-private group name.

Consistent with yet another aspect of the invention, a program product includes a program resident in the memory and executed by a first node among a plurality of nodes in a clustered computer system, where the program is configured to access a group that includes a plurality of members resident respectively on the plurality of nodes by receiving an access request that identifies a cluster-private group name associated with the group, where the plurality of members in the group map to the cluster-private group name, and processing the access request to initiate a group operation on at least a subset of the plurality of nodes that map to the cluster-private group name, and a non-transitory computer storage medium storing the program.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
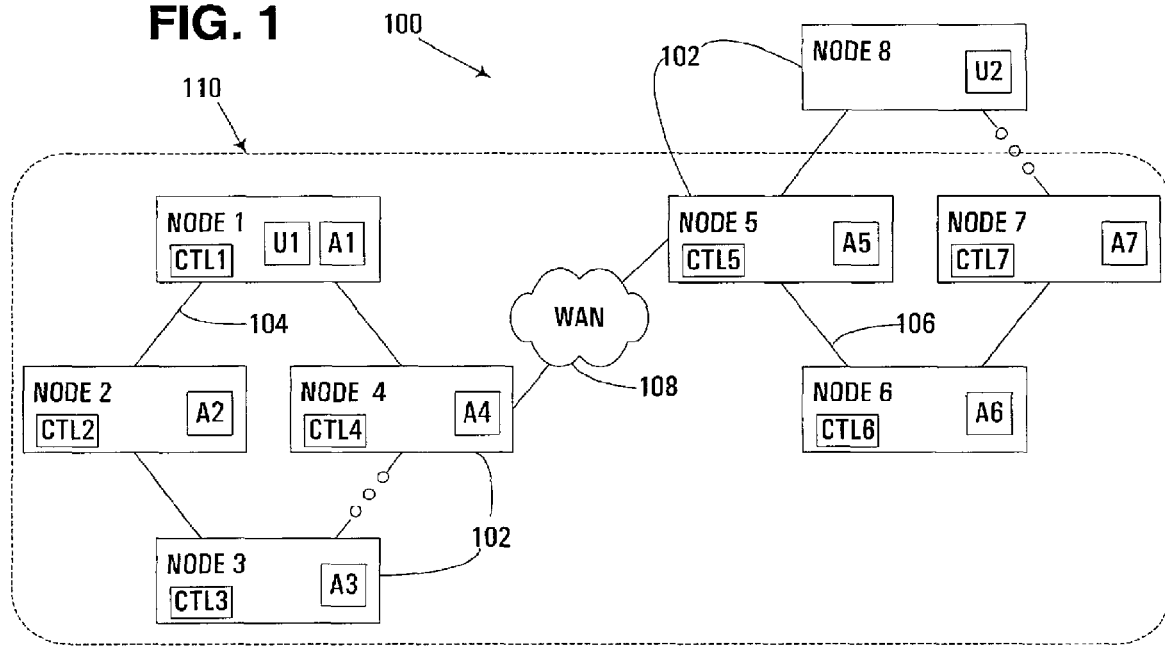
FIG. 1 is a block diagram of a networked computer system incorporating a clustered computer system consistent with the invention.

The embodiments described herein generally utilize cluster-private group names to access groups resident within a clustered computer system. Group names typically may represent any unique identifier capable of being associated with a software entity, including a combination of alphanumeric characters, a binary number, a pointer, or other form of handle, token or indicator. A group name is cluster-private if the group name cannot be accessed outside of a node that participates in a particular cluster, or cluster "instance". A group name may be cluster-private, for example, if the group name is resident upon a node that participates in a cluster instance, and is accessible by jobs executing on that node, i.e., if the group name is local to the node. A group name may also be cluster-private, for example, if some form of authentication mechanism is utilized to restrict access to the group name only to nodes and/or jobs that can establish participation in a cluster.

Group access requests initiated in connection with a group name may take a number of forms consistent with the invention. For example, a group access request may comprise a message passed to a clustering infrastructure or to a group member resident on the same or a different node as a requesting entity (e.g., a user job). In the alternative, a group access request may comprise a function call to a clustering infrastructure. Other manners of issuing a request, e.g., over a dedicated network, may be used in the alternative.

Group accesses typically take the form of initiated group operations, i.e., operations that are performed by one or more members of a group, either cooperatively or individually. Practically any function capable of being performed or initiated by software, and in particular by a cluster group, can be implemented within a group and initiated by a group access request in the manner described herein. For example, a print services group that manages printing operations for one or more printers coupled to a clustered computer system might support various printer operations such as printing, configuring a printer, managing a spool or queue, initializing or shutting down a printer, routing print jobs to specific printers, etc. For other types of groups, other types of group operations may be supported. Moreover, it should be appreciated that the types of operations that can be initiated on behalf of external users may be limited to a subset of the possible group operations supported by a group, i.e., some operations may be internal to a group and inaccessible from outside of the group.

In general, to support the ability to restrict access to group operations to unauthorized entities, the illustrated embodiments principally utilize the clustering infrastructure resident on each node that participates in a particular cluster to maintain a local mapping of group names to the addresses of the members of the group and/or the nodes upon which such members reside. As such, how messages are distributed to group members, and in particular, the addresses of those members, are effectively hidden from jobs or applications that access the clustering infrastructure. Therefore, rather than initiating an operation in a group by sending a request to a particular address, the request is sent to the clustering infrastructure and managed by the clustering infrastructure at a higher software layer and protocol than the low level network addresses that have conventionally been used to access cluster groups. Moreover, each node, and typically the clustering infrastructure within each node, is capable of locally resolving the group name—group member address mapping. Thus, an external name server is typically not required.

By utilizing group names in the manner described herein, a number of advantages are realized. For example, external access to a group by unauthorized entities is substantially restricted due to the inability of such entities to obtain the appropriate group name and/or make a request that identifies the group name, as well as the local resolution of name-address mappings within each node. As such, cluster security is substantially enhanced.

In addition, through the use of group names that are local to a particular cluster instance, it is possible to support the use of the same group name by multiple cluster instances on the same network without conflict, e.g., in a logically-partitioned system where multiple cluster instances execute on the same network. Furthermore, the network topology utilized by a clustered computer system is often irrelevant for the purposes of supporting group operations, since distribution of group messages in response to an authorized external request is managed within the clustering infrastructure of each participating node. Moreover, if desired, the herein-described embodiments support the ability to restrict access to a group to only a subset of nodes that participate in a cluster, given the ability to locally-manage group names within such nodes.

Turning now to the Drawings, wherein like numbers denote like parts throughout the several views, FIG. 1 illustrates a clustered computer system 100 including a plurality of nodes 102 (also designated as nodes 1-8) interconnected with one another in a distributed manner, e.g., via local area networks (LAN's) 104, 106 and a wide area network (WAN) 108. In the illustrated embodiment, a subset of the nodes in system 100 (e.g., nodes 1-7) cooperatively operate as a cluster 110, thus presenting a single system image to external computing devices. Other nodes and other devices may also reside upon and be incorporated into system 100; however, such devices may not participate in clustering, or may participate in a cluster other than cluster 110 (e.g., node 8, which does not participate in cluster 110 in the configuration shown in FIG. 1).

Any number of network topologies commonly utilized in clustered computer systems and other networked computer systems in general may be used to interconnect nodes 102 with one another consistent with the invention. Moreover, individual nodes 102 may be physically located in close proximity with other nodes, or may be geographically separated from other nodes, as is well known in the art. Furthermore, networks used to interconnect nodes may be private or public in nature, or may include a combination of private and public networks.

Figure 2:
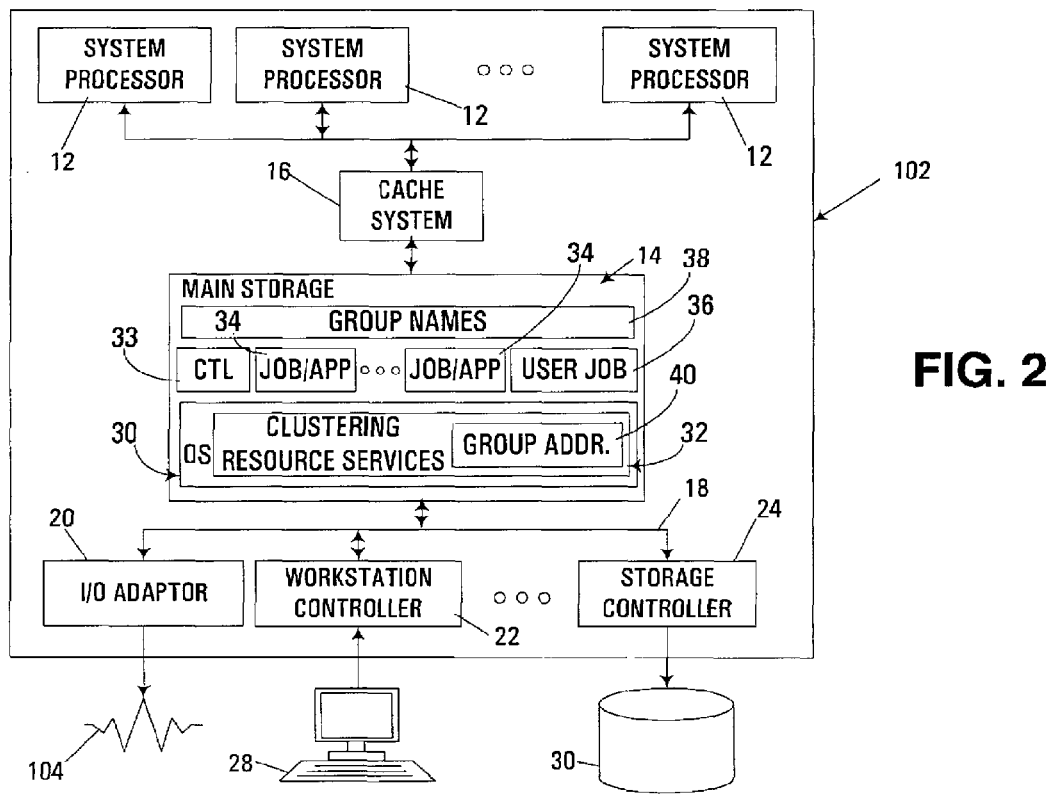
FIG. 2 is a block diagram of a node in the clustered computer system of FIG. 1.

Now turning to FIG. 2, an exemplary hardware configuration for one of the nodes 102 in cluster 110 is shown. Node 102 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 102 generally includes one or more system processors 12 coupled to a main storage 14 through one or more levels of cache memory disposed within a cache system 16. Furthermore, main storage 14 is coupled to a number of types of external devices via a system Input/Output (I/O) bus 18 and a plurality of interface devices, e.g., an input/output adaptor 20, a workstation controller 22 and a storage controller 24, which respectively provide external access to one or more external networks (e.g., a network 104), one or more workstations 28, and/or one or more storage devices such as a Direct Access Storage Device (DASD) 30. Any number of alternate computer architectures may be used in the alternative.

To implement privatized group access functionality consistent with the invention, each node in a cluster typically includes a clustering infrastructure to manage the clustering-related operations on the node. For example, node 102 is illustrated as having resident in main storage 14 an operating system 30 implementing a clustering infrastructure referred to as clustering resource services 32. One or more jobs or applications 34 are also illustrated, each having access to the clustering functionality implemented within clustering resource services 32. Moreover, node 102 is illustrated as including a user job 36, which may or may not be a member of a cluster group, or have access to the clustering functionality implemented within clustering resource services 32.

As will become more apparent below, one specific application of the herein-described privatized group access functionality is for use with accessing a cluster group with an entity that is external to the group, e.g., so that an entity that is not permitted to participate in a cluster group can make requests on that group. In the illustrated embodiment, therefore, user job 36 will typically represent such an external entity, which is not a member of a group to be accessed, but is capable of accessing services or resources supported or managed by the group to be accessed (whether or not that user job has access to clustering services, and whether or not that user job is a member of another group). In other embodiments, the privatized group access functionality described herein may be used in connection with inter-member communication within a group.

Also implemented within node 102 is a Cluster Control (CTL) job 33 that participates in a cluster control group to assist in managing clustering functionality on behalf of the node. In the illustrated embodiment, a cluster control job is required to be resident on every node that participates in a cluster, and it is through the cluster control group that various cluster management operations are performed. The presence of a cluster control job on each node permits, for example, a user job to issue an access request to the cluster control job on the same node, whereby the cluster control job operates as a "proxy" job to forward the request to the clustering resource services for processing. In other embodiments, however, a user job may be permitted to access the clustering resource services directly, either if the user job participates in clustering, or in some instances, if the user job is external to clustering, but resident on a node that participates in clustering. Typically, an access to the clustering resource services constitutes a function call, although other forms of issuing a request from a job to the clustering resource services (e.g., message-based requests, etc.) may be used in the alternative.

Returning briefly to FIG. 1, therefore, an exemplary cluster control group having members CTL1-CTL7 is illustrated as being resident on nodes 1-7, as is an exemplary group A including group members A1-A7 that are capable of performing a particular group operation desired by external users or jobs. One such user is represented by job U1, which is resident on a node that participates in clustering (node 1), and is therefore capable of accessing the group name associated with group A. In contrast, another user U2 is shown resident on node 8; however, access by user U2 to the group name for group A will be prevented due to the non-participation of node 8 in the cluster. As such, user U2 is restricted from initiating a group operation on group A in this exemplary scenario.

Returning to FIG. 2, it will be appreciated that the functionality described herein may be implemented in other layers of software in node 102, and that the functionality may be allocated among other programs, computers or components in cluster 110. Therefore, the invention is not limited to the specific software implementation described herein.

The discussion hereinafter will focus on the specific routines utilized to implement the above-described privatized group access functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of non-transitory computer storage media used to actually carry out the distribution. Examples of non-transitory computer storage media include but are not limited to recordable type media such as volatile and nonvolatile memory devices, floppy and other removable disks, hard disk drives, optical disks (e.g., CD-ROM's, DVD's, etc.), among others.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

To implement privatized group access, a number of data structures may be used consistent with the invention. For example, as shown in FIG. 2, a group names data structure 38 may be accessible by all jobs resident on a node, including a group name for each group that is resident on a node. In the illustrated embodiment, the group names data structure is maintained as a global data structure that is accessible by any job resident on the node. The group names data structure, however, is typically private with respect to the cluster. Put another way, any node that is not participating in a cluster is restricted from accessing the group names data structure, and by implication, any job resident on such an external node is similarly restricted from accessing the group names data structure. By requiring that all requests directed to a group be made using the group name associated with that group, external nodes and jobs are thus restricted from issuing requests to the group.

A number of different data structures may be utilized to implement group names data structure 38 consistent with the invention. For example, a table of available group names may be used in some embodiments. In other embodiments, other data structures, e.g., linked lists and the like, may be used instead.

Moreover, identical copies of the table may be resident and managed on each node in the cluster. In the alternative, a user job on one node in a cluster may be permitted to access a group names data structure resident on another node in the cluster, or in a database that is accessible by multiple nodes, so long as access to the group names data structure is restricted from access by jobs or other entities that are not resident on a node that participates in the cluster. Authentication may also be required to access a group names data structure, whereby appropriate authentication information may be stored for each group within its respective record in the group names data structure. Additional information, e.g., access lists, access rights, etc., may also be incorporated into such a data structure consistent with the invention.

FIG. 2 also illustrates a group addresses data structure 40, resident within and accessible by the clustering resource services 30 for the node. As discussed above, typically the mapping of a group name to the addresses of the members and/or nodes that will ultimately implement the desired group operation is maintained local to the clustering infrastructure of each node, and as such, typically data structure 40 is maintained as a local data structure that is accessible only by clustering resource services 32 on each node.

Figure 3:
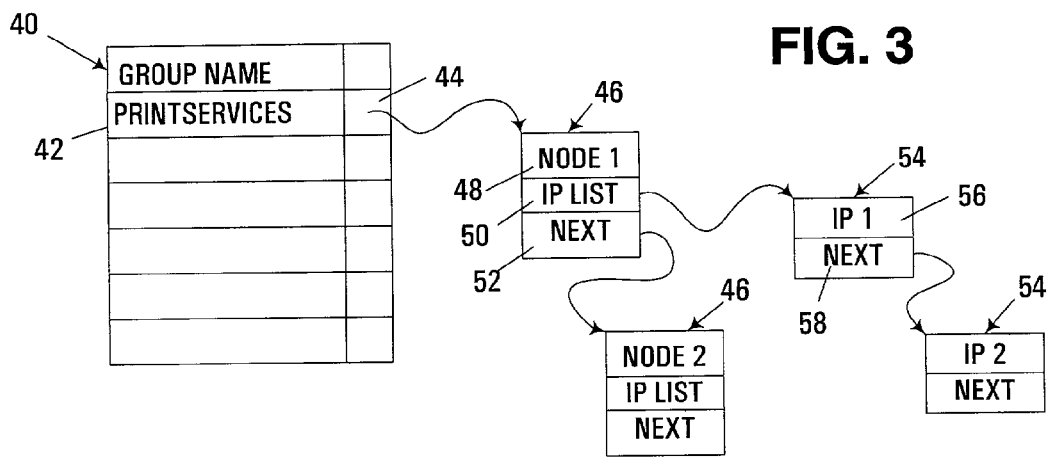
FIG. 3 is a block diagram of a group address table resident on the node of FIG. 2.

One exemplary implementation of data structure 40 is illustrated in FIG. 3, although it should be appreciated that other data structures may be used to store the necessary group address mappings described herein. Data structure 40 is typically local to the clustering infrastructure of a node, and is replicated among the various nodes participating in a cluster. It should be appreciated that a manner of distributing updates and synchronizing the various local data structures within a cluster may be used, e.g., via the ordered messaging scheme utilized to interface the clustering resource services of each node with one another.

Data structure 40 is illustrated as a table including a plurality of entries that map a group name 42 to a set of node names to which messages directed to a group should be directed. In the illustrated implementation, the list of nodes is implemented as a linked list that is pointed to by a pointer 44 associated with a group name 42. The linked list includes a plurality of node records 46, each identifying a node name 48, as well as a pointer 50 to a list of network (e.g., IP) addresses that may be used to access the node. Each node name record 46 also includes a next pointer 52 that points to the next node record 46 in the linked list, where a NULL value is typically stored in the next pointer 52 for the last node name record 46 in the list.

The IP address list functions as a mapping of IP addresses to a particular node name, and includes a plurality of IP address records 54, each including an IP address 56 and a next pointer 58 that points to the next IP record 54 in the linked list. A NULL value is typically stored on the next pointer 58 for the last record 54 in the list.

As is well known in the art, multiple IP addresses may be associated with a particular node so that a failure when attempting to access a node over a particular IP address may result in a call to a secondary IP address associated with the node.

It should be appreciated that alternate data structures may be utilized to store the information in data structure 40. Moreover, in some implementations, only one IP address may be associated with a particular node, whereby the mapping between a group name and a plurality of nodes may omit node name information, and a list of IP addresses may be directly pointed to by a group name entry in the mapping data structure. In addition, in some implementations group members, rather than nodes, may be associated with names or addresses, such that rather than mapping a group name to a list of nodes, a mapping may be provided between a group name and the actual group members. Other modifications will be apparent to one of ordinary skill in the art.

Figure 4:
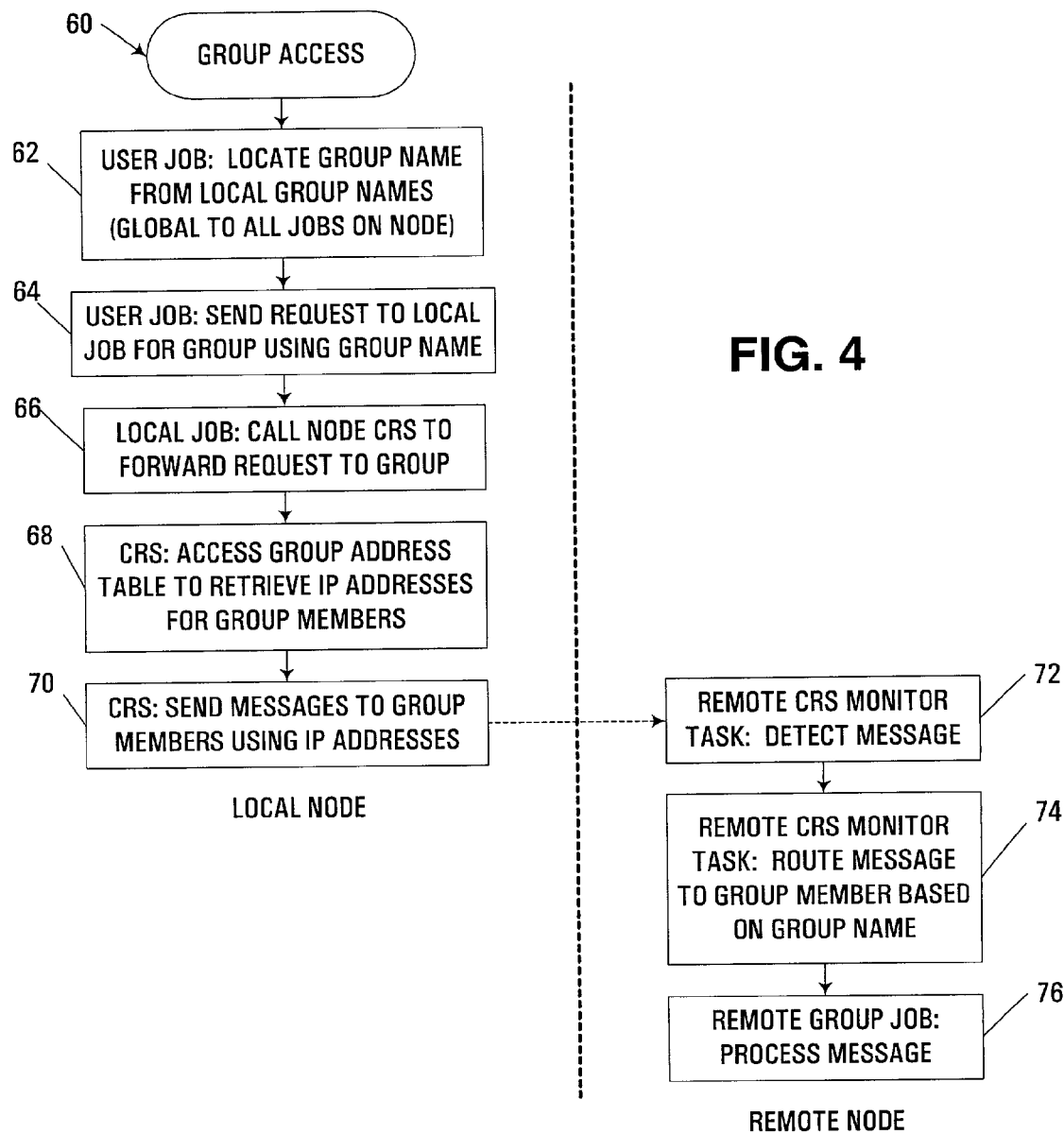
FIG. 4 is a flowchart illustrating the sequence of operations that occur during a group access operation initiated by a user job on a node in the clustered computer system of FIG. 1.

In operation, a group access is typically initiated by a user job resident on a node that participates in a cluster, to request that a particular group operation be performed by a group residing in the cluster. As an example, FIG. 4 illustrates an exemplary group access operation 60 that may be performed to initiate a group operation in response to an access request issued by an authorized entity external to a group in cluster 110. In the exemplary operation, blocks 62-70 represent the operations performed on a local node upon which a user job requesting access to a group is resident. Blocks 72-76 are performed by one or more remote nodes, and in particular, by each node upon which is resident a group member that is required to participate in the requested group operation.

As shown in block 62, a group access request is typically initiated by a user job by first locating a group name from the group names data structure on the local node. As discussed above, in the illustrated embodiment, the group names data structure is global to all jobs resident on the local node, but private with respect to entities that do not reside on the local node.

Next, as shown in block 64, the user job sends a request to the local job for the group using the group name. In the illustrated implementation, as discussed above, it is assumed that every group has a member on every node participating in a cluster. As such, the local group member can serve as a proxy job to pass a group access request to the group members resident on the other nodes in the clustered computer system. In other embodiments, however, a local group member may not be resident on the local node, whereby the user job may be required to issue a function call or otherwise notify the clustering resource services on the local node of the need to access a group. In still other embodiments, the local cluster control job may operate as a proxy job on behalf of another group in the cluster.

Next, as shown in block 66, the local job for the group issues a function call to the clustering resource services to forward the access request to the group. Subsequently, as shown in block 68, the clustering resource services accesses the group address data structure on the local node to retrieve a list of IP addresses corresponding to the group members to which a group message should be distributed. Then, as shown in block 70, the clustering resource services sends messages to the various group members using the list of IP addresses.

At each remote node that receives a sent message, a monitor task resident in the clustering resource services for the remote node detects reception of the message, as shown in block 72. The task then routes the message to the appropriate group member based upon the group name associated with the message, as shown in block 74. The message is then processed by the remote group job as shown in block 76, whereby the requested group operation is initiated by that group member. It will be appreciated that additional activities, e.g., responding to other nodes, or sending a result back to the user job, may also be performed subsequent to block 76. Typically, however, the processing of the message by the group job will vary widely depending upon the particular group operation that is requested.

It will be appreciated that various manners of sending messages between group members using the clustering resource services may be used consistent with the invention. For example, one suitable communication mechanism is disclosed in U.S. Pat. No. 6,192,417, by Block et al., and U.S. Pat. No. 6,993,034, by Block et al. (each of which is incorporated by reference herein), may be used. Other communication mechanisms may also be used in the alternative.

Moreover, to process messages on a remote node, various mechanisms may be utilized to detect and pass appropriate messages to the group members resident on that node. For example, where each node is implemented as an AS/400 midrange computer system available from International Business Machines Corporation, each group member may be associated with a Machine Interface (MI) queue that is associated with the group name, and a monitor job that reads from the queue. The queue may be registered with the clustering resource services to be a member of the group. Then, when a request is made to the group, the request is sent by the local node to the MI queue, whereby the monitor job detects the message, reads the message, and then processes the message as appropriate. Other hardware and/or software implementations may be utilized in the alternative.

Various modifications may be made without departing from the spirit and scope of the invention. In one implementation, for example, it may be desirable to require a group to have a group member on every node, even if some nodes do not actively participate in intra-group messaging (i.e., such nodes are "passive" from the perspective of the intra-group participating members). Other modifications will be apparent to one of ordinary skill in the art. Therefore, the invention lies in the claims hereinafter appended.

What is claimed is:

1. An apparatus, comprising:
    a memory accessible by a first node among a plurality of nodes in a clustered computer system; and
    a program resident in the memory and executed by the first node, the program configured to access a group that includes a plurality of members resident respectively on the plurality of nodes by receiving an access request that identifies a cluster-private group name associated with the group, wherein the plurality of members in the group map to the cluster-private group name, and processing the access request to initiate a group operation on at least a subset of the plurality of nodes that map to the cluster-private group name.

2. The apparatus of claim 1, further comprising a user job configured to generate the access request.

3. The apparatus of claim 2, wherein the program comprises a clustering infrastructure resident on the first node.

4. The apparatus of claim 3, further comprising a proxy job configured to forward the access request from the user job to the clustering infrastructure.

5. The apparatus of claim 1, further comprising:
- a cluster-private data structure configured to store the cluster-private group name; and
- a user job configured to access the cluster-private data structure to retrieve the cluster-private group name and generate the access request therefrom.

6. The apparatus of claim 5, wherein the cluster-private data structure is resident on the same node as the user job.

7. The apparatus of claim 6, wherein the cluster-private data structure is accessible only from the node upon which the cluster-private data structure is resident.

8. The apparatus of claim 1, further comprising a group address data structure configured to store a plurality of network addresses associated with the cluster-private group name, wherein the program is configured to initiate the group operation by accessing the group address data structure to retrieve the plurality of network addresses and sending a message to each of the plurality of network addresses.

9. The apparatus of claim 8, wherein the program comprises a clustering infrastructure, and wherein the group address data structure is local to the clustering infrastructure.

10. The apparatus of claim 1, wherein the program is further configured to process the access request by locally resolving on the first node a mapping between the cluster-private group name and a plurality of addresses associated with at least the subset of the plurality of nodes.

11. A clustered computer system, comprising:
- a plurality of nodes coupled to one another over a network;
- a group including a plurality of members resident respectively on the plurality of nodes, wherein the plurality of members in the group map to a cluster-private group name; and
- a program resident in a first node among the plurality of nodes and configured to access the group by receiving an access request that identifies the cluster-private group name associated with the group, and processing the access request to initiate a group operation on at least a subset of the plurality of nodes that map to the cluster-private group name.

12. A program product, comprising:
- a program resident in the memory and executed by a first node among a plurality of nodes in a clustered computer system, the program configured to access a group that includes a plurality of members resident respectively on the plurality of nodes by receiving an access request that identifies a cluster-private group name associated with the group, wherein the plurality of members in the group map to the cluster-private group name, and processing the access request to initiate a group operation on at least a subset of the plurality of nodes that map to the cluster-private group name; and
- a non-transitory computer storage medium storing the program.

* * * * *